United States Patent [19]

Peppel

[11] 4,164,876

[45] Aug. 21, 1979

[54] DOWNSHIFT INHIBITOR CIRCUIT

[75] Inventor: Jon H. Peppel, Horton, Mich.

[73] Assignee: Clark Equipment Company, Buchanan, Mich.

[21] Appl. No.: 794,763

[22] Filed: May 9, 1977

[51] Int. Cl.² .................. B60K 41/18; F16H 3/08; F16H 5/42; F16H 5/68

[52] U.S. Cl. ................................ 74/336 R; 74/365

[58] Field of Search ............... 74/365, 336 R, 336.5, 74/337, 866, 865, 864

[56] References Cited

U.S. PATENT DOCUMENTS

| | | | |
|---|---|---|---|
| 3,348,643 | 10/1967 | Townsend | 74/336 X |
| 3,403,587 | 10/1968 | De Castelet | 74/866 |
| 3,498,430 | 3/1970 | Briski | 74/336.5 X |
| 3,540,556 | 11/1970 | Snoy et al. | 192/51 X |
| 3,665,779 | 5/1972 | Mori | 74/866 |
| 3,732,755 | 5/1973 | Beig et al. | 74/336 X |
| 3,874,255 | 4/1975 | Minami | 74/866 |
| 3,937,107 | 2/1976 | Lentz | 74/865 X |
| 4,015,488 | 4/1977 | Akeson et al. | 74/866 |
| 4,038,889 | 8/1977 | Lindow et al. | 74/866 |

Primary Examiner—Lance W. Chandler
Attorney, Agent, or Firm—Ernst H. Ruf

[57] ABSTRACT

In a transmission control system for a multiple speed ratio powershift transmission having a plurality of fluid pressure operated clutches adapted to establish torque ratio changes and also including an electronic speed sensing system and downshift valve means for automatically shifting the transmission from a higher speed ratio to a lower speed ratio at a first predetermined vehicle ground speed, the addition of a downshift inhibitor or delay circuit for prohibiting downshifts from the higher speed ratio to the lower speed ratio while the vehicle undergoes a full throttle directional reversal.

10 Claims, 8 Drawing Figures

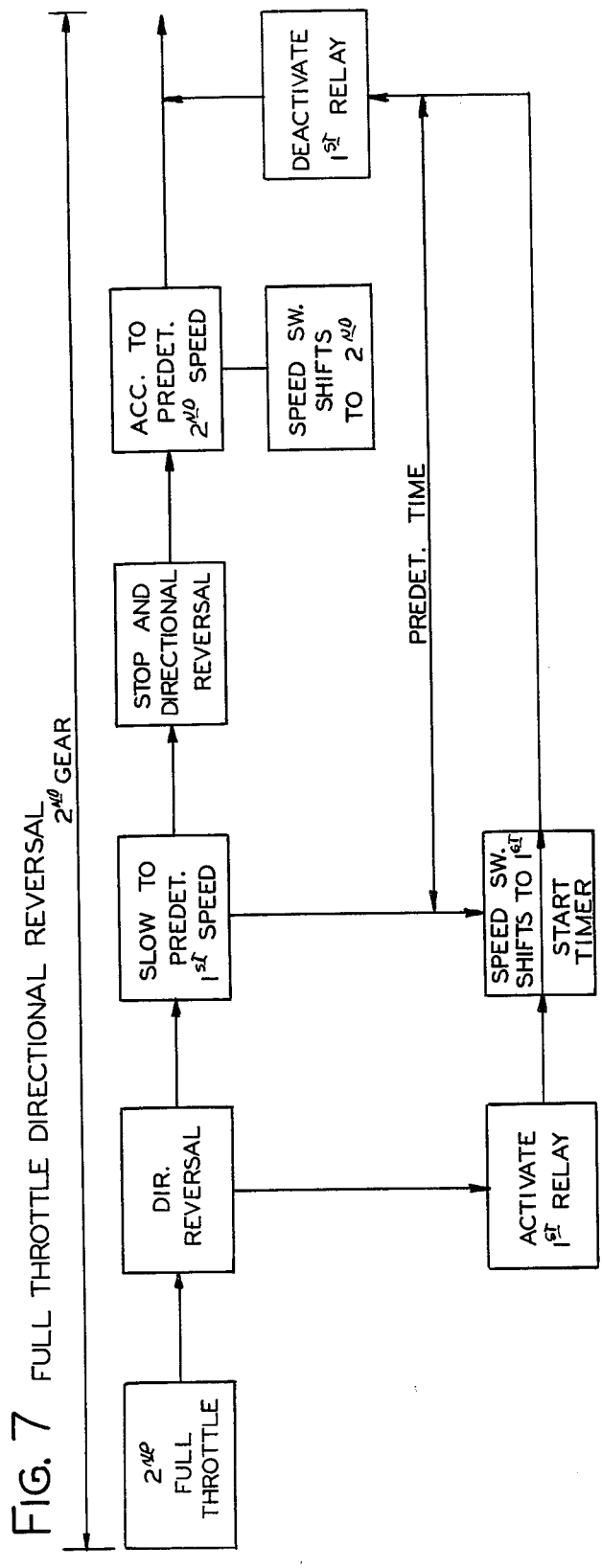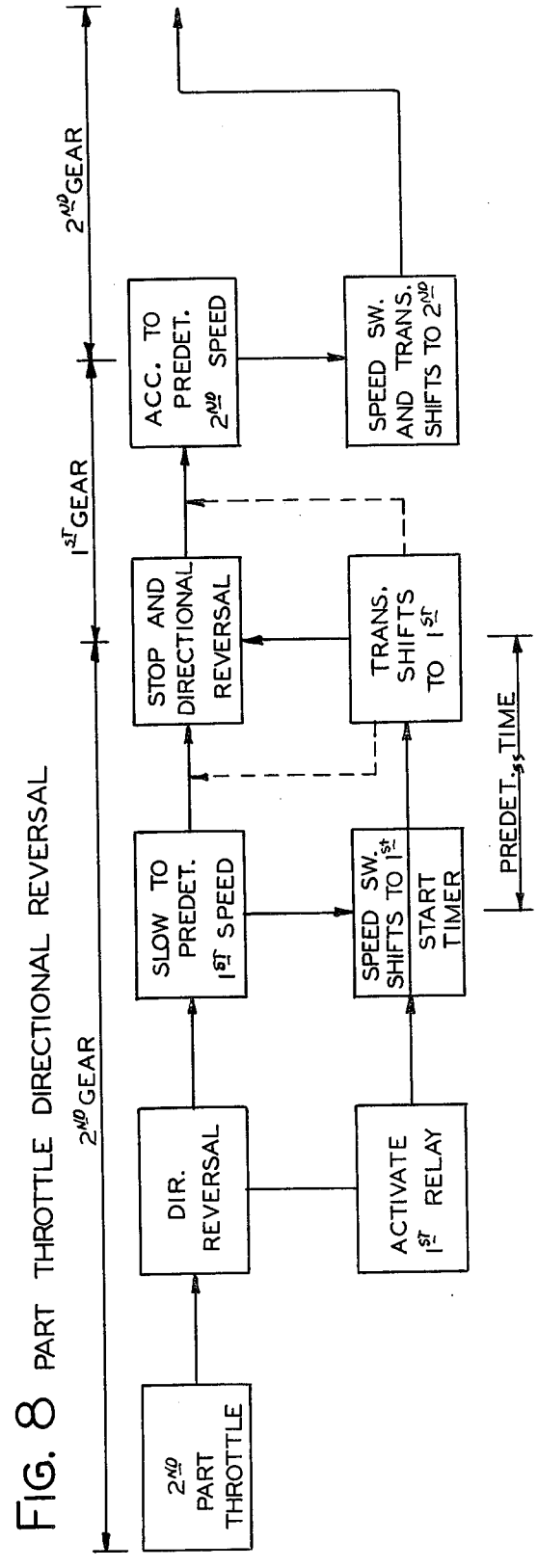

DOWNSHIFT INHIBITOR CIRCUIT

BACKGROUND OF THE INVENTION

1. Field of the Invention

The field of art to which this invention pertains includes pressurized fluid control systems for multiple speed ratio powershift transmissions. More particularly, the control system is adapted to automatically shift the transmission from a higher speed ratio to a lower speed ratio at a first predetermined vehicle ground speed and thereafter shift back to said higher speed ratio at a second higher predetermined vehicle ground speed. It is the function of the downshift inhibitor circuit to prevent downshifting of the transmission during vehicle full throttle directional reversals.

2. Description of the Prior Art

In front end loader applications, for example, during bucket loading at the pile portion of the work cycle, the vehicle is required to crowd the pile as well as pry or lift with the bucket. The pile is normally approached in second gear from a travel portion of the work cycle, with initial crowding and bucket work being done in second gear. During the second gear operation, in comparison with first gear operation, less torque is available at the driving wheels which has a desirable effect of minimizing wheel spin. However, when additional hydraulic demands are placed on the engine, as a result of prying or bucket lifting operations, insufficient power remains for transmission to the driving wheels for effectively crowding the pile. Therefore, at this time, the operator must normally shift to first gear and, upon loading the bucket and backing out of the pile, he must then manually shift to second gear. In order to relieve the operator from excessive shifting between first and second gears, it is very desirable to have an automatic shift system so that, when the vehicle ground speed drops to a first predetermined speed, the transmission is automatically downshifted from second to first gear which in turn is followed by an automatic upshift when the vehicle ground speed thereafter exceeds a second higher predetermined speed. A transmission shift control system that provides this automatic function is set forth in my co-pending Application Ser. No. 779,445, filed on Mar. 21, 1977, which is also assigned to the assignee of this invention.

For the same vehicle speed, during full throttle operation, it is desirable to perform the directional reversal of the vehicle in second rather than in first gear because of the inherent lower rotational speeds of both the forward and reverse clutch components in second gear operation. Full throttle shifts into and out of first gear are quite harsh, therefore, a principal object of this invention is to provide means fo prohibiting downshifts from second to first gear while the vehicle undergoes full throttle directional reversals. The description of my co-pending application is fully repeated hereinafter to assure full understanding of its structure and function which are considered necessary to fully understand the function and appreciate the benefits of my downshift inhibitor or delay circuit.

Prior art patents wherein shift operation is effected by electrohydraulic means responsive to operating parameters include U.S. Pat. Nos. 3,732,755 to Beig et al; 3,403,587 to DeCastelet; and 3,665,779 to Mori. Furthermore, a downshift inhibitor for a powershift transmission is also shown in U.S. Pat. No. 3,937,107 to Lentz.

SUMMARY OF THE INVENTION

In order to meet the objective of prohibiting transmission downshifts from second to first while the vehicle undergoes full throttle or rapid directional reversal, the transmission control system is provided with a downshift inhibitor or delay circuit which is activated only when the vehicle travels in the second gear speed range. The downshift inhibitor or delay circuit is interposed in the electronic speed sensing system between the electronic speed switch and the solenoid valve and basically takes the form of a timer circuit that is energized upon the initiation of a vehicle directional reversal while the vehicle travels in the second gear speed range.

The timer circuit itself delays the downshift of the transmission for a predetermined length of time which is sufficient for the vehicle to reverse and accelerate, at full throttle, to the normal second gear speed range. This delay is required in order to inhibit full throttle downshifts, and the delay is of sufficient duration that the vehicle goes through the normal cycle of slowdown, stop and acceleration in second gear until the ground speed exceeds a second higher predetermined speed, before the delay time runs out.

Thus, it should be understood that during full throttle directional reversal, the reversal itself is accomplished in second gear and that there is full use of the downshift inhibitor or delay circuit in that the electronic speed switch provides a signal for shifting the transmission to its first speed setting which, however, is delayed by the timer circuit with the result that the transmission itself remains in second gear.

During part throttle or slower directional reversal, the predetermined time delay runs out and the transmission shifts to first gear, with this downshift not being objectionable.

The features and advantages of the present invention will be more readily understood by persons skilled in the art when following the detailed description in conjunction with the several drawings.

BRIEF DESCRIPTION OF THE DRAWINGS

FIG. 7 is a schematic flow diagram depicting the sequence of events during a full throttle vehicle directional reversal.

FIG. 8 is a further schematic diagram depicting the sequence of events during a part throttle vehicle directional reversal.

DESCRIPTION OF THE PREFERRED EMBODIMENT

Figure 1:
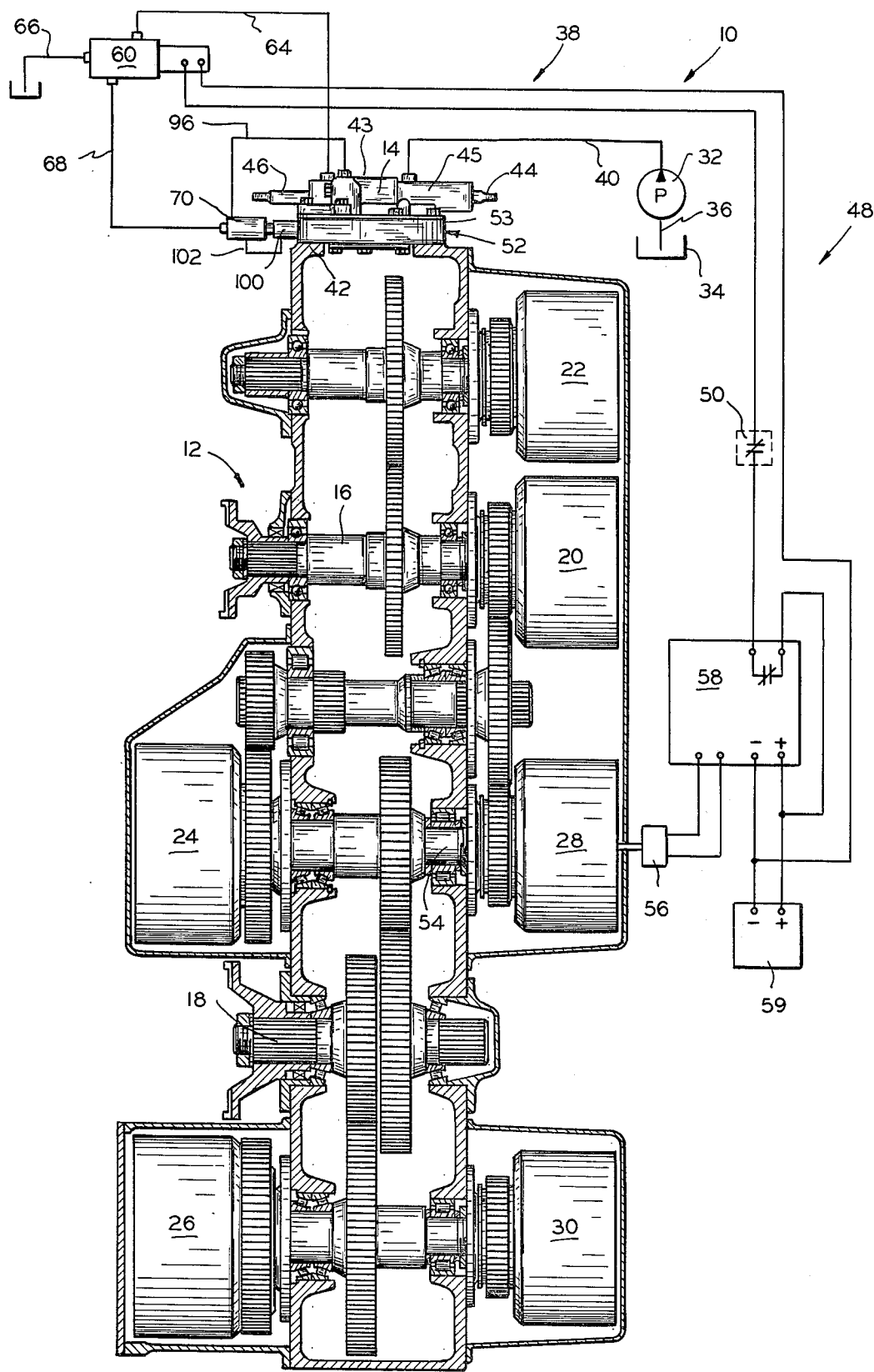
FIG. 1 shows diagrammatically and schematically a transmission control system in conjunction with a multiple speed ratio powershift transmission.

Referring now the drawings, specifically to FIG. 1, there is shown a transmission control system 10 in combination with a multiple speed ratio powershift transmission 12 and its associated transmission control cover 14.

Transmission 12 includes an input shaft 16, an output shaft 18, a fluid operated directional control clutch 20 which conditions the transmission for forward drive when engaged, and a fluid operated directional control clutch 22 which conditions the transmission for reverse drive when engaged. In addition, a plurality of fluid operated speed ratio clutches 24, 26, 28, and 30, when engaged, condition the transmission for drive in first, second, third, and fourth speed ratios, respectively. A more detailed description of a transmission of this type may be found in U.S. Pat. No. 3,126,752 issued in the name of R. H. Bolster on Mar. 31, 1964.

Control cover 14 has a plurality of valves housed therein which among others generally include a conventional pressure regulating valve for limiting the maximum pressure in the control system, a conventional directional control valve 45, and a conventional speed control valve 43. These valves control the flow of pressurized fluid that operates the various fluid actuated clutches and lubricates the gears and bearings associated with transmission 12 in a manner well known in the art. More detailed showings of similar transmission control covers and their associated valves may be found in U.S. Pat. No. 3,334,703 to Zeller and in U.S. Pat. No. 3,559,780 to Erdman. A prime mover (not shown) is used to drive one or more charge or auxiliary pumps of any well known construction, one of which is schematically shown at 32. In order to selectively pressurize control cover 14, pump 32 draws and pressurizes fluid from a fluid supply reservoir or sump 34 from which fluid is drawn through a conduit 36, with conduit 40 linking pump 32 with control cover 14.

Transmission 12 is often used in the drive lines of construction machinery, a specific example thereof being front end loader applications, with the speed control shifting and the directional control shifting being performed by the operator generally through manual hand control levers (not shown) connected with speed control valve lever 44 and directional control valve lever 46, respectively, in control cover 14. In front end loader operation, for example, the operator is generally occupied with manually hand-manipulating both steering and hydraulic bucket control functions, and, therefore, it is inconvenient for him to have to manually hand shift back and forth between first and second gears, for example, in addition to hand shifting between the forward and reverse during a loading-unloading operation. It should, of course, be recognized that in front end loader operation, there is extensive short duration reciprocation of the front end loader in conjunction with the loading and unloading operations.

In order to relieve the operator from constantly shifting between first and second gears, when speed control lever 44 is in second gear location, transmission control system 10 allows transmission 12 to operate in second gear until ground speed drops to a first predetermined speed whereupon transmission 12 automatically shifts back to first gear and stays in first gear until ground speed exceeds a second higher predetermined speed, at which time it automatically shifts back into second gear.

In order to accomplish this objective, transmission control system 10 is provided with an automatic shift system 38, the best mode of which includes an electronic speed sensing system 48 in association with a downshift valve means 52 which in turn is interposed between transmission control cover 14 and electronic transmission casing 42. Electronic speed sensing system 48 basically includes a signal generator 56, an electronic speed switch 58 and a solenoid valve 60. Signal generator 56 is mounted on transmission first clutch shaft 54, with the latter being drivingly connected to the output shaft and therefore rotating at a speed proportional to road speed. Signal generator 56, which produces an electronic pulse signal proportional to road speed, may take the form of a model ESG signal generator (style ESGO) manufactured by Synchro-Start Products, Inc. of Skokie, Ill. Signal generator 56 in turn is electrically connected to an electronic speed switch 58 which may consist of a model ESSB-1AT electronic speed switch also manufactured by Synchro-Start Products, Inc. of Skokie, Ill. Electronic speed switch 58 is also electrically connected to both a DC power supply 59 and a solenoid valve 60 which may take the form of Model No. 8-3A-3-24 Solenoid Valve manufactured by Fluid Power Systems Division of AMBAC Industries, Inc. of Wheeling, Ill.

Solenoid valve 60 is also hydraulically interconnected with control cover 14 via conduit 64, as well as having a vent conduit 66 and being further hydraulically interconnected with a second speed clutch valve 62 (FIG. 2) in valve means 52 via conduit 68 and piston-cylinder actuator-transfer valve 70.

As previously noted, control cover 14 serves to control the hydraulic pressures for actuating the speed ratio and directional control clutches via speed control and directional control valves 43 and 45, respectively, with these valves forming no part of the present invention.

Figure 2:
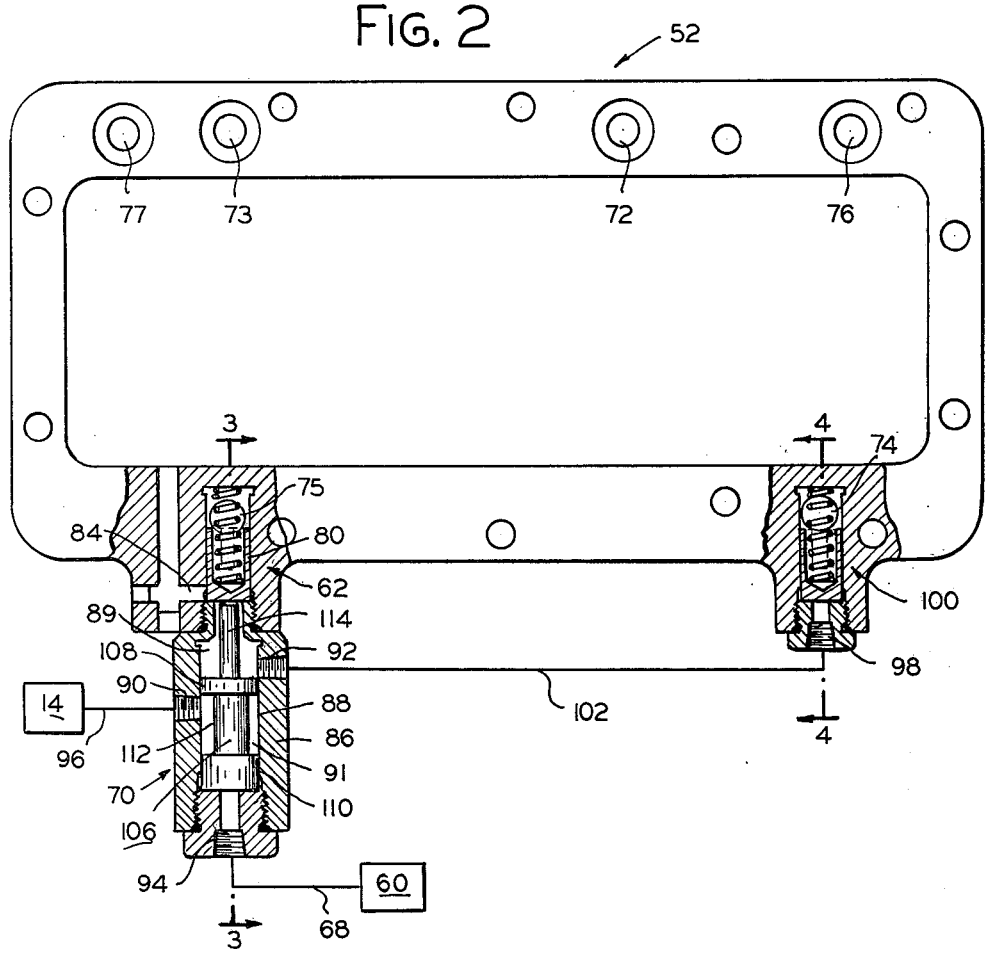
FIG. 2 is a top plan view of the sandwich valve of the transmission control system, with portions thereof being broken away for the sake of clarity.

As best seen in FIG. 1, downshift valve means 52, which includes sandwich valve 53, is interposed between control cover 14 and transmission casing 42, with the actual structure of downshift valve means 52 being best seen in FIG. 2. Valve 53, which takes the form of a center-cored generally rectangular plate, includes a plurality of bores or apertures that serve to channel hydraulic pressure to the various clutches, with apertures 72, 73 permitting hydraulic interconnection with forward and reverse clutches 20, 22, respectively. Similarly, apertures 74, 75, 76, and 77 are hydraulically interconnected with first, second, third, and fourth speed ratio clutches 24, 26, 28, and 30, respectively. It should be understood that apertures 72-77 are connected with appropriate portions of valves 43 and/or 45 and via hydraulic lines (not shown) with their respective clutches in a manner well known in the art.

Figure 3:
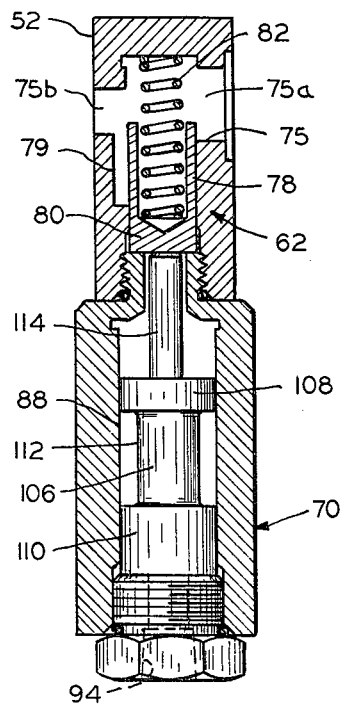
FIG. 3 is an enlarged sectional view, taken along line 3—3 of a valve embodied in the control system.
Figure 4:
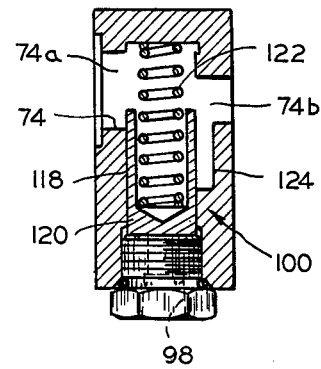
FIG. 4 is an enlarged sectional view, taken along line 4—4 of FIG. 2, of a further valve embodied in the control system, with the valve spool being in the open or unshifted position.

FIGS. 2 and 3 show second speed clutch valve 62 slidably mounted within bore 78 of sandwich valve 53, with bore 78 intersecting bore 75. Slidably disposed in bore 78 is a spool 80 which is normally biased to the position shown by means of the helical spring 82 and is movable, in a position opposing the biasing of spring 82, by means of piston and cylinder type fluid actuator valve 70. The portion of bore 78 remote from bore 75 is also connected to a vent conduit 84. Valve bore 78 includes a relieved portion 79 which allows the venting of the residual fluid pressure within aperture exit portion 75b via vent conduit 84 while spool 80 closes aperture entrance portion 75a. Actuator-transfer valve 70 is threaded into a portion of bore 78 and includes a body 86 having a longitudinally extending bore 88 therein. Communicating with bore 88 are longitudinally spaced ports 90 and 92, as well as end port 94. Port 90 of valve 70 is connected to the second speed ratio clutch pressure supply in control cover 14 by means of conduit 96, while port 92 is connected to port 98 of a first speed clutch valve 100 via conduit 102. Conduit 68 connects port 94 with solenoid valve 60.

Slidably disposed in valve bore 88 is a spool 106 whose spaced land portions 108, 110 define a groove 112 which serves to selectively interconnect ports 90 and 92 upon the movement of spool 106 in response to a control pressure from solenoid valve 60. Land portion 108 also serves to separate portions 89 and 91 of valve bore 88 when spool 106 is in the position shown in FIGS. 2 and 3. In addition, spool 106 includes a stalk portion 114 which abuts and serves to move spool 80 in opposition to spring 82. It should be understood that the interconnection of conduits 90 and 92, via the movement of spool 106, simultaneously closes second speed aperture 75 in sandwich valve 53 to fluid flow from control cover 14, thereby shutting off the flow of pressurized fluid to second speed ratio clutch 26 and consequently disengaging same.

Figure 5:
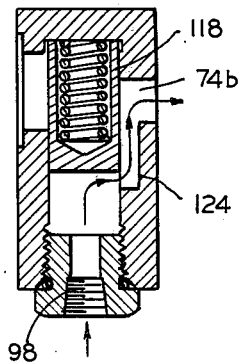
FIG. 5 shows the valve of FIG. 4 with the valve spool being in the closed or shifted position.

The structure of first speed clutch valve 100 is substantially similar to that of second speed clutch valve 62 and includes a spool 120 reciprocable in bore 118 of sandwich valve 53, with bore 118 perpendicularly intersecting bore 74. Spool 120 is normally biased to the position shown by means of helical spring 122 and is movable in opposition thereto as a result of fluid pressure from second speed clutch valve 62 which enters through conduit 102 and port 98. Valve bore 118 also includes a relieved portion 124 which allows fluid pressure to enter aperture exit portion 74b while spool 120 closes aperture entrance portion 74a to direct fluid flow from control cover 14, as shown in FIG. 5, thereby consequently engaging first speed ratio clutch 24 via the pressurized fluid that normally actuates second speed ratio clutch 26.

In normal second speed ratio operation, pressurized fluid for second speed ratio clutch 26 passes vertically through aperture 75 of sandwich valve 53. In addition to being controlled by speed control valve 43, the second ratio clutch pressure is also controlled by actuator valve 70 and second speed clutch valve 62. Actuator-transfer valve 70 in turn is, of course, controlled by solenoid valve 60. Once vehicle ground speed drops to a first predetermined speed, for example, 1 mile per hour, this predetermined first speed is sensed by electronic speed switch 58 that supplies a signal which activates solenoid valve 60. Actuation of valve 60 permits a control pressure from control cover 14 to reciprocate valve 70 and second speed clutch valve 62. As previously noted, clutch valve spool 80 shuts off a flow of pressurized fluid to second speed ratio clutch 26 whereas the movement of actuator valve spool 106 channels the second clutch valve pressure in conduit 96 into the previously unpressurized first speed clutch valve 100. As best seen in FIG. 5, first speed clutch valve spool 120 closes off aperture portion 74a of first speed aperture 74, thereby blocking off communication with the control cover while simultaneously permitting the pressurized fluid from valve 70 to enter aperture portion 74b which thereafter engages first speed ratio clutch 24. Thus, second speed ratio clutch pressure is used to activate first speed ratio clutch 24 and effect a downshift.

When the vehicle ground speed exceeds a second higher predetermined speed, for example, 2½ miles per hour, a signal is removed from electronic speed switch 58 to deactivate solenoid valve 60, thereby cutting off the flow of second speed ratio clutch pressure into first clutch valve 100 and at the same time, opening second speed ratio aperture 75 so as to permit engagement of second speed ratio clutch 26 which effects an upshift. The downshift and consequent upshift are fully automatic and completely free the operator from the burden of manual control in regard thereto. It should be understood that electronic speed switch 58 can be set for varying first and second predetermined group speeds. Furthermore, automatic shift system 38 can, of course, also be utilized with other than only first and second speed ratios if so desired. In addition, if desired by the operator, shift system 38 can be disconnected via override switch 50 preferably located in the vehicle cab.

Figure 6:
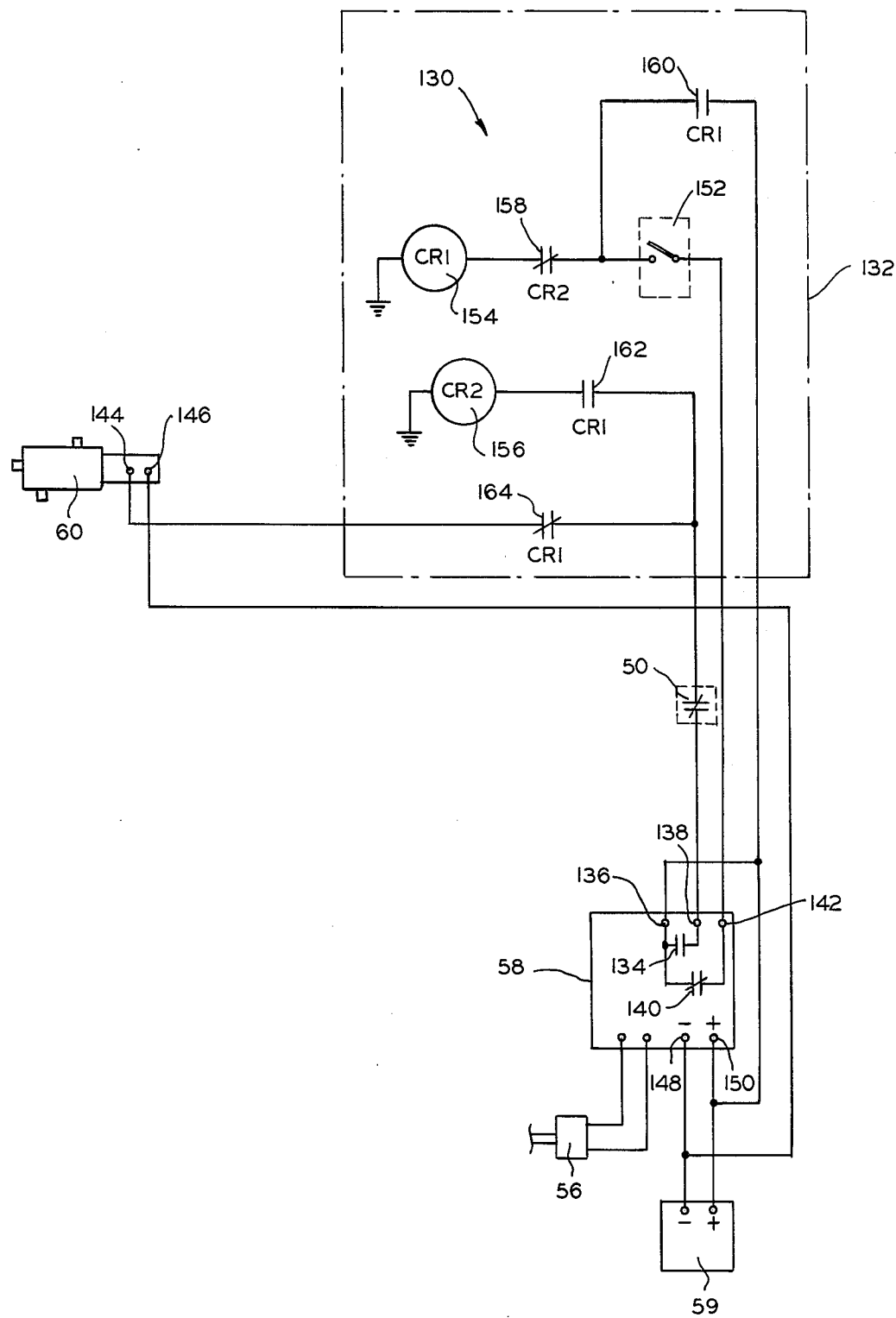
FIG. 6 is a schematic diagram showing the shift inhibitor circuit of this invention added to the transmission control system.

In order to prevent downshifting of the transmission during full throttle or rapid directional reversals, added to previously described automatic shift system 38, is a downshift inhibitor or delay circuit 130 which is interposed in electronic speed sensing system 48 between electronic speed switch 50 and solenoid valve 60, as shown in FIG. 6. Circuit 130 which is encased within dashed line area 132, is shown in a position just prior to a directional reversal of the vehicle and basically takes the form of a timer circuit that is energized by initiating a directional reversal when traveling in second gear only.

Associated with circuits 130, but inherent in electronic speed switch 58, is normally closed switch 134, located between terminals 136 and 138, and normally opened switch 140 located between terminals 136 and 142. It should be noted, however, that switches 134 and 140 are shown as open and closed, respectively, since switches 134 and 140 are in these positions at a time just prior to a directional reversal. During vehicle slowdown, switches 134 and 140 assume closed and open positions, respectively, at or below a first predetermined speed and remain in these positions until the vehicle accelerates to and above the second predetermined speed, whereupon their positions become open and closed, respectively. Thus, it should be understood that FIG. 6 shows circuit 130 in a position just prior to a directional reversal of the vehicle with switches 134, 140 being shown in the operative positions they occupy when the vehicle is above the second predetermined speed.

Also connected with speed switch terminal 138 is solenoid valve terminal 144, with solenoid terminal 146 being connected with power supply 59 and speed switch terminal 148. In addition, power supply 59 is also connected with speed switch terminal 150. As previously shown in FIG. 1, interposed in the connection between speed switch terminal 138 and solenoid terminal 146 is override switch 50 that is preferably located in the vehicle cab.

Connected with speed switch terminal 142 is a normally open switch 152 that is remotely mounted in the vehicle operator-actuated transmission control (not shown), with switch 152 being momentarily activated every time the vehicle operator performs a directional reversal via directional control valve lever 46 (FIG. 1). Switch 152 is interposed between speed switch terminal 142 and a first relay 154. A second relay and timer 156 branches off from the connection between speed switch terminal 138 and solenoid terminal 144.

Second relay and timer 156 controls a normally closed switch 158 that is located between first relay 154 and neutral start switch 152. In a similar manner, first relay 154 controls a normally open first switch 160 that is located in a line connected to speed switch terminal 150 and whose other end is connected to the line between neutral start switch 152 and second relay and timer switch 158. First relay 154 further controls a normally open second switch 162 that is located between second relay and timer 156 and speed switch terminal 138. Furthermore, first relay 154 also controls a normally closed third switch 164 that is located between speed switch terminal 138 and solenoid valve terminal 144. First relay 154 may take the form of Model R10-E1-Y4-V700-4PDT, while second relay and timer 156 may take the form of Model CUH-42-30010-DPDT, both of which are manufactured by the Potter & Brumfield Division of AMF Inc., of Princeton, Ind.

It is the function of circuit 130 to prohibit downshifts from second to first gear while undergoing full throttle directional reversal. It is desirable to perform the directional reversal in second rather than in first gear due to the inherent lower rotational speeds of both the forward and reverse clutches in second gear operation for the same vehicle speed. A downshift into first clutch 24 during full throttle directional reversal is quite harsh and is thus uncomfortable for the operator as well as being hard on the vehicle itself.

Inhibitor circuit 130 is a timer circuit which is energized upon vehicle directional reversal initiated by the operator when traveling in second gear only. The timer portion of second relay and timer 156 is activated when electronic speed switch 58 is reset, which occurs when vehicle ground speed drops to a first predetermined speed. The transmission downshift is delayed for a predetermined length of time which is long enough for the vehicle to reverse and accelerate, at full throttle, to the normal second gear range. The delay is needed to inhibit full throttle downshifts, and the delay is of sufficient duration that the machine goes through the normal cycle of slowdown, stop and acceleration in second gear until the ground speed exceeds a second higher predetermined speed, before the delay time runs out.

The sequence of events that occur during a full throttle or rapid directional reversal is best understood by a perusal of the flow diagram shown in FIG. 7 which diagrammatically shows a complete full throttle directional reversal in second gear. During the predetermined delay time there occurs a slowdown from a first predetermined ground speed in one direction to a stop and then an acceleration in the other direction to a second predetermined group speed.

Circuit 130 is energized when a directional reversal is made in second gear by the operator. As a result of the reversal, switch 152 closes momentarily thereby activating first relay 154 and as a result thereof reversing first relay switches 160, 162 and 164. Switch 160 locks in the circuit to first relay 154, whereafter switch 152 again opens.

When the vehicle speed falls below the first predetermined speed, speed switch 58 closes switch 134 and opens switch 140. Since switch 162 is still closed as a result of the directional reversal, the timer portion of second relay and timer 156 is activated. However, during full throttle actuation, the predetermined time before the second relay is actuated, is long enough for the vehicle to change directions and accelerate above the second predetermined speed thereby inhibiting the shift to first gear. After the predetermined time has elasped, second relay 156 is activated and in turn reverses second relay switch 158 thereby causing it to open. The opening of switch 158 deactivates first relay 154 and returns first relay switches 160, 162 and 164 to their normal state. The opening of switch 162 deactivates second relay 156 which subsequently returns second relay switch 158 to its normally closed state. It should be understood that at this time circuit 130 has completely cycled through its sequence and all switches are again in their normally open or closed states.

Thus, it should be understood that during full throttle directional reversal, the reversal itself is accomplished in second gear. There is full use of circuit 130 in that speed switch 58 shifts to its first speed setting, however, the transmission itself remains in second gear.

FIG. 8 takes the form of a flow diagram that depicts a part throttle or slower directional reversal. In comparison with FIG. 7, it will be seen that the first three block diagrams are identical, and, during a predetermined time, the timer portion of second relay and timer 156 goes through the same sequence cycle as previously described with reference to FIG. 7 and all switches in circuit 130 again return to their normal state. However, at this time, since the speed of the vehicle is still below the second predetermined speed, switch 134 is closed, and after the de-energizing of the timer circuit portion of 156 and the closing of switch 164, solenoid 60 is energized thus causing the transmission to downshift to first gear. Thereafter, the vehicle slows down, comes to a stop and accelerates in the other direction. Once it exceeds the second predetermined speed, the settings of switches 134 and 140 are reversed thereby causing the transmission to be shifted to second gear. Thus, on a part throttle or slower directional reversal, the predetermined time delay runs out and the transmission shifts to first gear, with this downshift not being objectionable. Again, there is full use of circuit 130, however, at part throttle, the predetermined time of second relay and timer 156 is exeeded and the transmission shifts to first gear. It should be understood that the actual shift of the transmission into first gear may take place at, before, or slightly after the vehicle has actually made its reversal, this fact being indicated by the dashed lines in the FIG. 8 diagram. It should be noted that the predetermined time lines in FIGS. 7 and 8 represent the same time span, although the FIG. 8 line is broken due to space constraints.

In case the operator undertakes to reverse the direction of the vehicle after first completely stopping the vehicle and thereafter initiating the directional reversal, downshift inhibitor circuit 130 is not activated since with this operational sequence, at directional reversal time, electronic speed switch 58 is in the first gear position, with circuit 130 being activated only when the vehicle travels in the second gear speed range. It should, of course, be understood that circuit 130 can also be utilized with other than only first and second speed ratios if so desired.

From the foregoing, it is believed that those familar with the art will readily recognize and appreciate the novel concepts and features of the present invention. Obviously, while the invention has been described in relation to only a single embodiment, numerous variations, changes and substitutions of equivalents will present themselves to persons skilled in the art and may be made without necessarily departing from the scope and principles of this invention. As a result, the embodiment described herein is subject to various modifications, changes and the like, without departing from the scope and spirit of the invention, with the scope thereof being determined solely by reference to the claims appended hereto.

What is claimed is:

1. In a transmission control system for a vehicle including a multiple speed ratio powershift transmission having a plurality of fluid pressure operated clutches, adapted to establish torque ratio changes; a source of pressurized fluid; a speed control cover including a manually-actuated control means and a speed control valve for controlling the flow of fluid to said clutches; an electronic speed sensing system; and downshift valve means, for automatically shifting said transmission from a higher speed ratio to a lower speed ratio at a first predetermined ground speed by diverting the fluid for pressurizing a higher speed ratio clutch to a lower speed ratio clutch and automatically shifting said transmission from said lower speed ratio back to said high speed ratio at a second predetermined ground speed by ceasing the diverting of said fluid, wherein the improvement comprises means for prohibiting automatic downshifts from said higher speed ratio to said lower speed ratio while said vehicle undergoes a rapid directional reversal.

2. The improved transmission control system of claim 1 wherein said means for prohibiting downshifts includes a downshift delay circuit.

3. The improved transmission control system of claim 2 wherein said electronic speed sensing system includes an electronic speed switch and a solenoid valve and said downshift delay circuit is interposed in said electronic speed sensing system between said electronic speed switch and said solenoid valve.

4. The improved transmission control system of claim 3 wherein said downshift delay circuit basically takes the form of a timer circuit including a relay and a timer, with said relay being activated upon the initiation of a vehicle directional reversal while said vehicle travels at said higher speed ratio, with said timer however not starting until said vehicle has attained said first predetermined ground speed.

5. The improved transmission control system of claim 4 wherein said higher speed ratio is second gear and said lower speed ratio is first gear.

6. The improved transmission control system of claim 5 wherein said timer circuit delays the downshift of said transmission for a predetermined length of time which is sufficient for said vehicle to reverse and accelerate, at full throttle, to the normal second gear speed range.

7. The improved transmission control system of claim 6 wherein said predetermined length of time is of sufficient duration that said vehicle is able to go through a normal cycle of slowdown, stop and acceleration in second gear in another direction, until the ground speed thereof exceeds said second predetermined speed, before said predetermined length of time is exceeded.

8. For use with a vehicle having a transmission with separate fluid operated clutches for selecting a plurality of speed ratios as well as forward drive and reverse drive, a transmission control system including a source of pressurized fluid; a transmission control cover with a speed control valve for controlling the flow of fluid to said speed ratio clutches; a transmission automatic downshift system comprising an electronic speed sensing system, including an electronic signal generator, an electronic speed switch and a solenoid valve; said electronic speed sensing system being in combination with downshift valve means for automatically shifting said transmission, while said speed control valve is set for a second speed ratio, to a lower first speed ratio, at a first predetermined ground speed by diverting pressurized fluid from a second speed ratio clutch to a first speed ratio clutch and thereafter, at a second higher predetermined ground speed, automatically shifting back to said second speed ratio by ceasing the diverting of said fluid, wherein the improvement comprises a downshift inhibitor circuit for prohibiting automatic downshifts from said second speed ratio to said first speed ratio while said vehicle undergoes a rapid directional reversal.

9. The improved transmission control system of claim 8 wherein said downshift inhibitor circuit is interposed in said electronic speed sensing system between said electronic speed switch and said solenoid valve, with said downshift inhibitor circuit taking the form of a timer circuit including a relay and a timer, with said relay being activated upon the initiation of a vehicle directional reversal while said vehicle operates in said second speed ratio, with said timer however not starting until said vehicle has attained said first predetermined ground speed.

10. The improved transmission control system of claim 9 wherein said timer circuit delays the downshift of said transmission for a predetermined length of time which is of sufficient duration that said vehicle is able to go through a normal cycle of slowdown, stop and acceleration in said second gear ratio in an opposite direction, until the ground speed thereof exceeds said second higher predetermined ground speed.

* * * * *